(12) United States Patent  
Carter et al.

(10) Patent No.: US 8,205,904 B1  
(45) Date of Patent: Jun. 26, 2012

(54) VEHICLE MOUNTING

(76) Inventors: Mac E. Carter, Ashtabula, OH (US);  
Andrea A. Carter, Ashtabula, OH (US)

(*) Notice: Subject to any disclaimer, the term of this patent is extended or adjusted under 35 U.S.C. 154(b) by 229 days.

(21) Appl. No.: 12/832,468

(22) Filed: Jul. 8, 2010

Related U.S. Application Data

(60) Provisional application No. 61/223,804, filed on Jul. 8, 2009.

(51) Int. Cl.  
*B62D 49/04* (2006.01)

(52) U.S. Cl. ............... 280/481; 280/477; 280/479.2; 280/515; 280/495

(58) Field of Classification Search .......... 280/481, 280/477, 479.2, 515, 495  
See application file for complete search history.

(56) References Cited

U.S. PATENT DOCUMENTS

| | | | | |
|---|---|---|---|---|
| 4,911,596 A | * | 3/1990 | Fetter | 414/24.5 |
| 4,930,801 A | * | 6/1990 | Gillund | 280/481 |
| 6,314,666 B1 | | 11/2001 | Klemenhagen | |
| 2010/0019517 A1 | | 1/2010 | Maus | |

* cited by examiner

*Primary Examiner* — Lesley D Morris  
*Assistant Examiner* — Marlon Arce  
(74) *Attorney, Agent, or Firm* — L.C. Begin & Associates, PLLC.

(57) ABSTRACT

One embodiment of the vehicle mounting includes a frame assembly. The frame assembly may include a panel member, a set of elongated members, and a bracket member. The panel member may be configured to be supported on a front part of the vehicle. The set of elongated members may extend from a surface of the panel member. The bracket member may be associated at the free end portions of the set of elongated members. The vehicle mounting may further include an arm assembly carried by the bracket member of the frame assembly. The arm assembly may include a first arm member and a second arm member adapted to be telescopically received within the first arm member. The arm assembly may also include a hitch member operatively coupled with the second arm member. The hitch member may be adapted to receive a towing rod of the wheeled article.

6 Claims, 3 Drawing Sheets

VEHICLE MOUNTING

CROSS REFERENCE TO RELATED APPLICATION

This application claims the benefit of U.S. Provisional Application No. 61/223,804 filed on Jul. 8, 2009, the disclosure of which is incorporated by reference.

FIELD OF THE DISCLOSURE

The present disclosure generally relates to goods transportation, and, more particularly, to an attachment for skid loaders that facilitates in towing wheeled articles.

BACKGROUND OF THE DISCLOSURE

Skid loaders (also known as "skid steer loaders") are frequently employed for maneuvering large items on locations such as, construction sites, warehouses, and farms. In addition to skid loaders, various wheeled articles such as; trailers, wagons, and machineries, are generally utilized in such locations. Space constraints in such locations makes movement of various wheeled articles such as, trailers, wagons, and machinery, difficult. Moreover, the ground on such locations may also include obstacles such as snow, stones, mud, water and the like, which may make the movement of the various wheeled articles further difficult.

Further, such wheeled articles may require an auxiliary vehicle, such as the skid loaders, for being maneuvered from one place to another within the location. For maneuvering such wheeled articles, a portion of the wheeled article is required to be connected with the auxiliary vehicle. However, both the wheeled article and the auxiliary vehicle are generally ill-equipped to be readily connected. Therefore, in the absence of a convenient mechanism for connecting the wheeled article and the auxiliary vehicle, the maneuvering of the wheeled article with the auxiliary vehicle may become inconvenient and a bothersome task.

SUMMARY OF THE DISCLOSURE

One embodiment of a vehicle mounting for attaching a wheeled article having a towing rod, to a vehicle may include a frame assembly. The frame assembly may include a panel member configured to be supported on a front part of the vehicle. The frame assembly may further include a set of elongated members extending from a surface of the panel member. The set of elongated members converge at free end portions thereof. The frame assembly may furthermore include a bracket member associated at the free end portions of the set of elongated members. The vehicle mounting may further include an arm assembly. The arm assembly may include a first arm member supported by one or more elongated members of the set of elongated members. The arm assembly may also include a second arm member adapted to be telescopically received within the first arm member. The arm assembly may also include a hitch member carried by the bracket member of the frame assembly. Further, the hitch member may be operatively coupled with the second arm member. Specifically, the telescopic receiving of the second arm member within the first arm member enables removable securing of the hitch member with the towing rod of the wheeled article.

BRIEF DESCRIPTION OF THE DRAWINGS

The advantages and features of the present disclosure will become better understood with reference to the following detailed description and claims taken in conjunction with the accompanying drawing, in which:

Like reference numerals refer to like parts throughout the description of several views of the drawings.

DETAILED DESCRIPTION OF THE DISCLOSURE

The exemplary embodiments described herein detail for illustrative purposes are subject to many variations in structure and design. It should be emphasized, however, that the present disclosure is not limited to a particular vehicle mounting as shown and described. It is to be understood that various omissions and substitutions of equivalent are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The use of terms "including," "comprising," or "having" and variations thereof herein is meant to encompass the items listed thereafter and equivalents thereof as well as additional items. The terms, "first," "second," "top," "bottom," and the like, herein do not denote any order, elevation or importance, but rather are used to distinguish one element with another. Further, the terms, "a" and "an" herein do not denote a limitation of quantity, but rather denote the presence of at least one of the referenced item.

The present disclosure provides a vehicle mounting for facilitating attachment of a wheeled article to a vehicle. Specifically, the vehicle mounting may be used for attaching a towing rod of the wheeled article to a vehicle, such as a skid loader. The attaching of the wheeled article to the skid loader enables convenient and quick maneuvering of the wheeled article within confined locations, such as construction sites, farms and the like.

Figure 1:
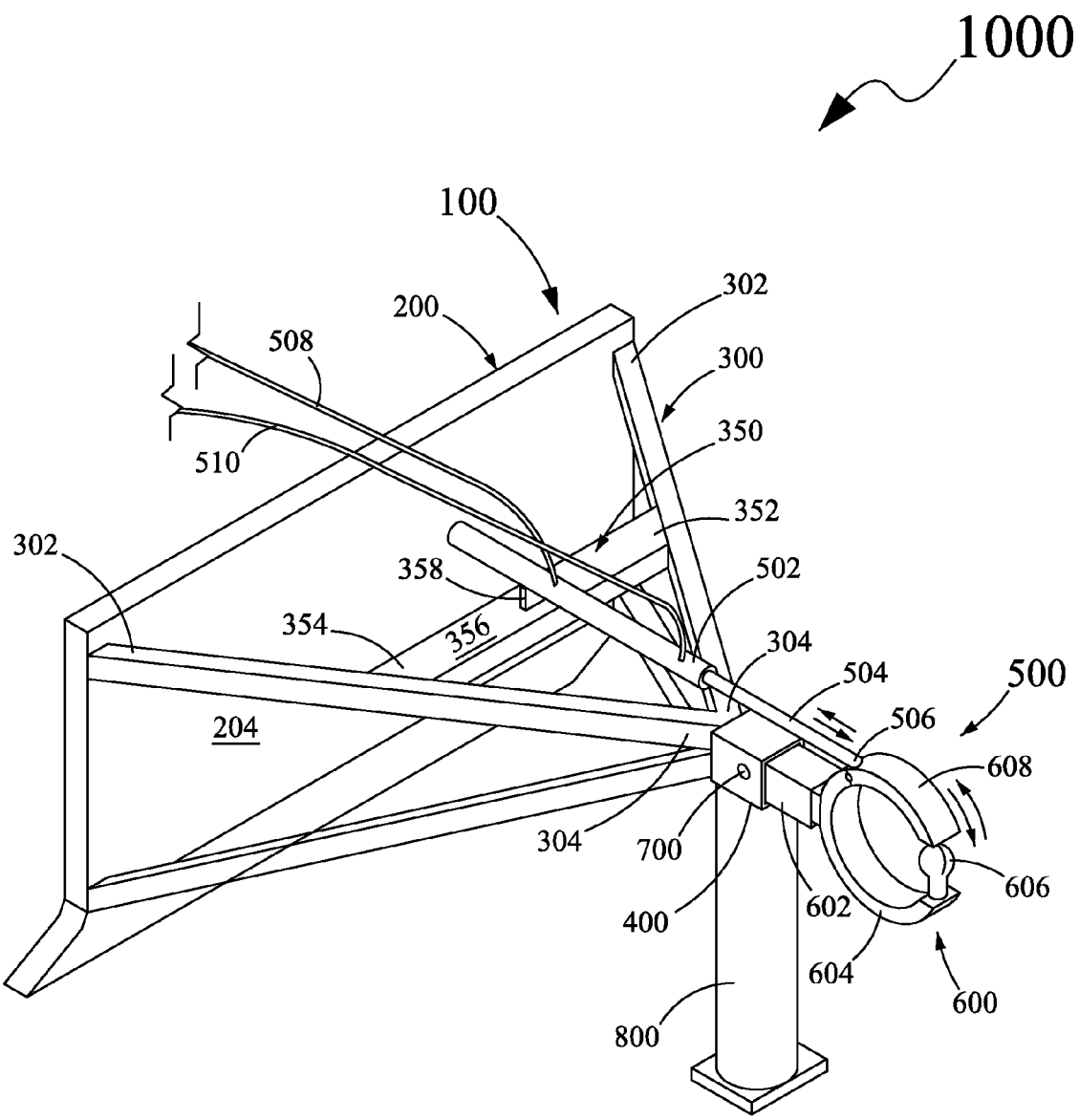
FIG. 1 is a perspective view of one embodiment of a vehicle mounting.
Figure 2:
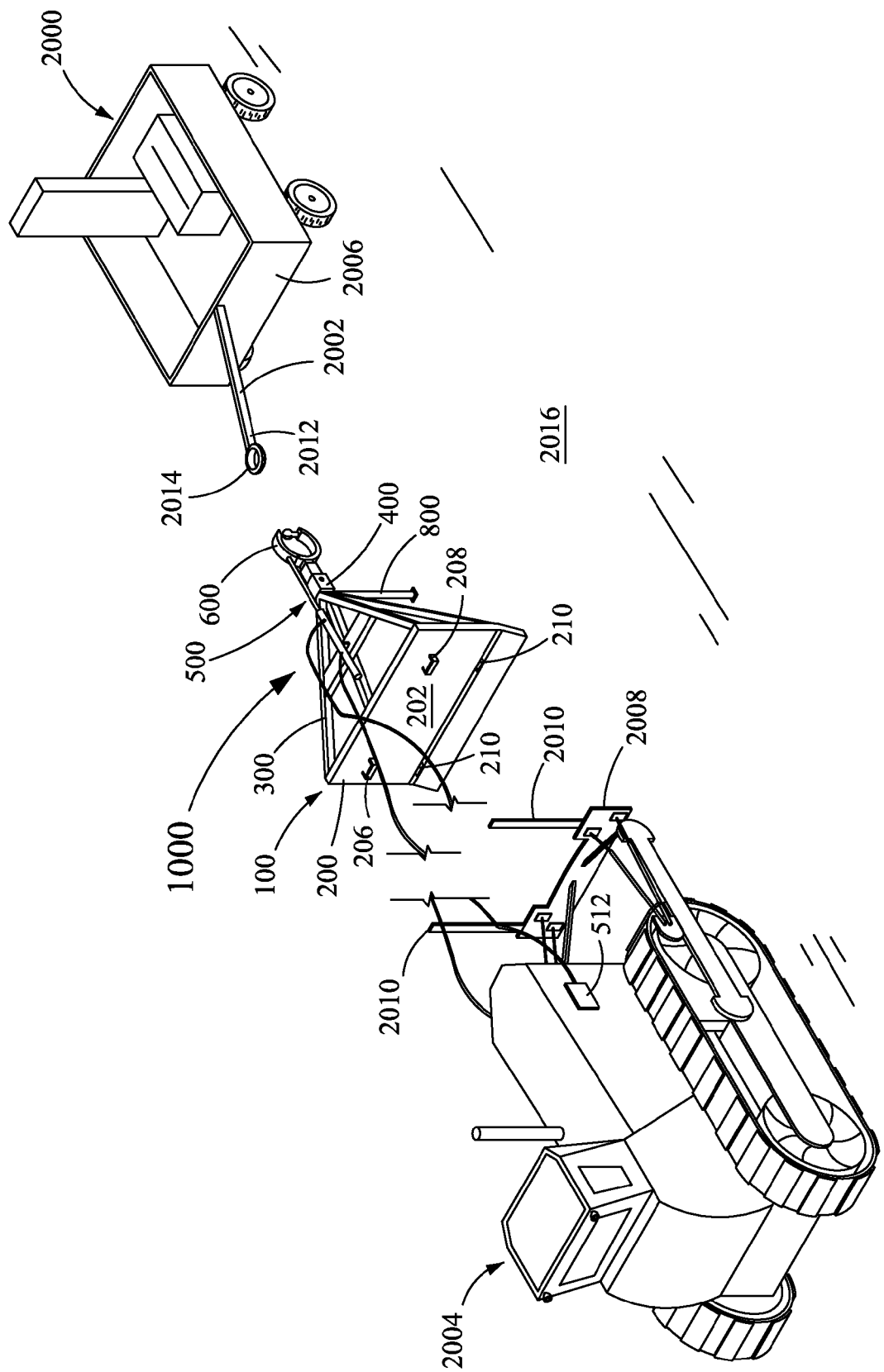
FIG. 2 is a perspective view of the vehicle mounting of FIG. 1, in an unassembled configuration to a vehicle and a wheeled article.
Figure 3:
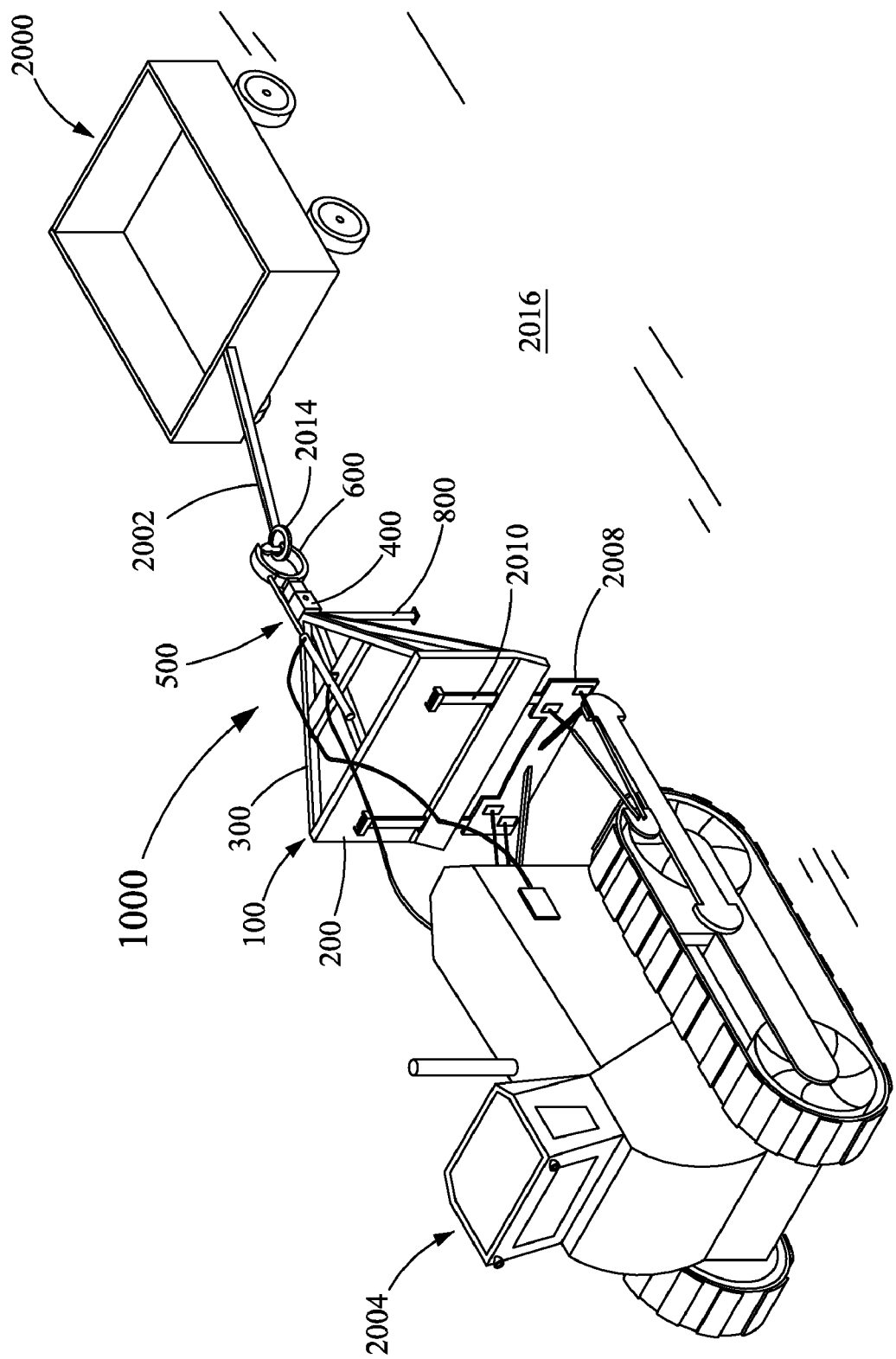
FIG. 3 is a perspective view of the vehicle mounting of FIG. 1, in an assembled configuration to the vehicle and the wheeled article.

FIGS. 1-3 depict one embodiment of a vehicle mounting 1000. The vehicle mounting 1000 may be utilized for attaching a wheeled article 2000 having a towing rod 2002 to a vehicle 2004. The wheeled article 2000 may be trolleys, trailers, wagons, machinery equipments and the like. The towing rod 2002 may extend outwardly from an external surface, such as a front face 2006, of the wheeled article 2000. The vehicle 2004 may be a conventional skid loader. Alternatively, the vehicle 2004 may be any other vehicle without departing from the scope of the present disclosure.

The vehicle mounting 1000 may include a frame assembly 100. The frame assembly 100 may include a panel member 200. The panel member 200 may be configured to be supported on a front part 2008 of the vehicle 2004. The panel member 200 may include a first face 202 and a second face 204 opposite to the first face 202. The first face 202 may include one or more attaching brackets, such as an attaching bracket 206 and an attaching bracket 208, for facilitating the supporting of the frame assembly 100 on the front part 2008 of the vehicle 2004. Particularly, the attaching brackets 206, 208 may be adapted to be attached to one or more prongs 2010 disposed on the front part 2008 of the vehicle 2004, thereby supporting of the frame assembly 100 on the front part 2008 of the vehicle 2004. Moreover, one or more engagement slots, such as engagement slots 210 may extend from the first face 202 to the second face 204. The one or more prongs 2010 may be inserted through the engagement slots 210 for supporting of the frame assembly 100 on the front part 2008 of the vehicle 2004. Additionally, a plurality of elements (not shown), such as clips, nuts and bolts may be also used for securely supporting the frame assembly 100 on the front part 2008 of the vehicle 2004.

The frame assembly 100 may further include a set of elongated members 300. Each of the set of elongated members 300 may include an attached end portion 302 and a free end portion 304. Each attached end portion 302 and free end portion 304 may hereinafter be collectively referred to as attached end portions 302 and free end portions 304. The attached end portions 302 may be attached to the second surface 104 of the panel member 200. Further, each of the set of elongated members 300 may extend from the second face 204 of the panel member 200 such that, the set of elongated members 300 may converge at the free end portions 304.

Further, the frame assembly 100 may include a bracket member 400. The bracket member 400 may be carried by the free end portions 304 of the set of elongated members 300. The bracket member 400 may be configured to be a hollow cubical structure having an open face.

As best shown in FIG. 1, the frame assembly 100 may further include a plate member 350. The plate member 350 may be attached to a pair of elongated members of the set of elongated member 300. Specifically, the plate member 350 may include a first end portion 352, a second end portion 354 and a top face 356. The first end portion 352 and the second end portion 354 maybe attached to the set of elongated members 300.

The vehicle mounting 1000 may further include an arm assembly 500. The arm assembly 500 may include a first aim member 502 supported by one or more elongated members of the set of elongated members 300. Specifically, as best shown in FIG. 1, the first aim member 502 may be carried by a tab 358 on the top face 356 of the plate member 350. The arm assembly 500 may further include a second arm member 504. The second arm member 504 may be adapted to be telescopically received within the first arm member 502. The second arm member 504 may include a first end portion concealed within the first arm member 502, and a free end portion 506 disposed outside the first arm member 502.

The arm assembly 500 may further include a set of hydraulic connectors, such as a first hydraulic connector 508 and a second hydraulic connector 510. An end portion of each of the first hydraulic connector 508 and the second hydraulic connector 510 may be connected to the first aim member 502. An opposite end portion of the each of the first hydraulic connector 508 and the second hydraulic connector 510 may be adapted to be connected to a hydraulic power source 512 of the vehicle 2004, shown in FIG. 2. The connection of the set of hydraulic connectors i.e. each of the first hydraulic connector 508 and the second hydraulic connector 510 to the hydraulic power source 512 enable telescopic movement of the second arm member 504 within the first arm member 502. For example, each of the first hydraulic connector 508 and the second hydraulic connector 510 may be operated by operating knobs carried by the vehicle 2004 for enabling the telescopic movement of the second arm member 504 within the first arm member 502.

The arm assembly 500 may further include a hitch member 600. In the present embodiment the hitch member 600 may be a pintle ball hitch. Alternatively, the hitch member 600 may be a goose neck ball hitch. The hitch member 600 may include a butt portion 602 carried by the bracket member 400 of the frame assembly 100. For example, the butt portion 602 may be received by the bracket member 400, and thereafter a suitable fastener 700, such as a nut and bolt arrangement, may be used for the coupling therebetween. The hitch member 600 may also include a fixed portion 604 integral with the butt portion 602. The fixed portion 604 may include a hitch ball 606 carried by a free end thereof and away from the butt portion 602. The hitch member 600 may also include a movable portion 608 carried by the fixed portion 604. Specifically, the movable portion 608 may be pivotally carried by the fixed portion 604. In the present embodiment, the movable portion 608 and the fixed portion 604 may be configured to be a C-shaped jaw, adapted to attain one of an open position and a closed position.

Specifically, the movable portion 608 may be operatively coupled with the second arm member 504. Therefore, when the second arm member 504 may telescopically move within the first arm member 502, the movable portion 608 may pivotally move away from the fixed portion 604 for allowing the hitch member 600 to attain an open position. Similarly, when the second arm member 504 may telescopically move out of the first arm member 502, the movable portion 608 may pivotally move towards the fixed portion 604 for allowing the hitch member 600 to attain a closed position.

Further, the hitch member 600 may be adapted to be engaged with an end portion 2012 of the towing rod 2002 of the wheeled article 2000. Specifically, the end portion 2012 may be configured with a loop 2014 adapted to be received by the hitch ball 606, thereby attaching the wheeled article 2000 to the hitch member 600.

Additionally, the vehicle mounting 1000 may include a supporting leg 800 extending from one of the set of elongated members 300 and the bracket member 400. In FIGS. 1-3, the supporting leg 800 is shown to be extending only from the bracket member 400; however, it should be evident to those skilled in the art the supporting leg 800 may alternatively extend from the set of elongated members 300. The supporting leg 800 may facilitate in stably resting the frame assembly 100 on a ground surface 2016.

During utilization of the vehicle mounting 1000, the loop 2014 of the end portion 2010 of the towing rod 2002 of the wheeled article 2000 may be received by the hitch ball 606 for attaching the wheeled article 2000 to the hitch member 600. Specifically, the first hydraulic connector 508 and the second hydraulic connector 510 may be operated to telescopically move the second arm member 504 with respect to the first arm member 502. The telescopic receiving of the second arm member 504 within the first arm member 502 allows the hitch member 600 to attain the open position, thereby allowing the loop 2014 to be received by the hitch ball 606. Further, telescopic outward movement of the second arm member 504 from the first arm member 502 allows the hitch member 600 to attain the closed position, thereby locking the loop 2014 with respect to the hitch ball 606. Specifically, the loop 2014 may be avoided to move out of the hitch ball 606 during the closed position of the hitch member 600. The engagement of the hitch member 600 with the towing rod 2002 attaches the wheeled article 2000 to the vehicle 2004.

The present disclosure therefore provides a vehicle mounting, such as the vehicle mounting 1000, for assisting individuals in conveniently transporting wheeled articles, such as the wheeled article 2000 in locations having limited space, such as constructional sites, warehouses and farms. The vehicle mounting 1000 may include a frame assembly, such as the frame assembly 100 having a panel member, such as the panel member 200. The panel member 200 may be supported on a front of a vehicle, such as the vehicle 2004. The vehicle 2004 may be a skid loader. The frame member 100 may include a bracket member, such as the bracket member 400. The vehicle mounting 1000 may include an arm assembly, such as the arm assembly 500. The arm assembly 500 may include a hitch member, such as the hitch member 600, adapted to be engaged with the wheeled article 2000. Further, the hitch member 600 may be secured with the bracket member 400 thereby attaching the wheeled article 2000 to the vehicle 2004. The vehicle mounting 1000 therefore provides a convenient way of attaching the wheeled article 2000 to the vehicle 2004.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A vehicle mounting for attaching a wheeled article to a vehicle, the vehicle mounting comprising:
    a frame assembly comprising,
        a panel member configured to be supported on a front part of the vehicle,
        a set of elongated members extending from a surface of the panel member, the set of elongated members converging at free end portions thereof, and
        a bracket member associated at the free end portions of the set of elongated members; and
    an arm assembly, the arm assembly comprising,
        a first arm member supported by one or more elongated members of the set of elongated members,
        a second arm member adapted to be telescopically received within the firs arm member, and
        a hitch member carried by the bracket member of the frame assembly, the hitch member operatively coupled with the second arm member,
    wherein the telescopic receiving of the second arm member within the first arm member enables removable securing of the hitch member with the wheeled article.

2. The vehicle mounting of claim 1, wherein the arm assembly further comprises a set of hydraulic connectors adapted to be connected to a hydraulic power source of the vehicle, the connection of the set of hydraulic connectors to the hydraulic power source enabling telescopic movement of the second arm member within the first arm member.

3. The vehicle mounting of claim 1, further comprising a supporting leg extending from one of the set of elongated members and the bracket member, the supporting leg adapted to stably rest the frame assembly on a ground surface.

4. The vehicle mounting of claim 1, wherein the frame assembly further comprises a plate member attached to a pair of elongated members of the set of elongated members, the plate member adapted to support the first arm member thereon.

5. The vehicle mounting of claim 1, wherein the panel member of the frame assembly comprises one or more attaching brackets for facilitating the supporting of the frame assembly on the front of the vehicle.

6. The vehicle mounting of claim 1, wherein the hitch member is a pintle ball hitch.

* * * * *

UNITED STATES PATENT AND TRADEMARK OFFICE
CERTIFICATE OF CORRECTION

PATENT NO.        : 8,205,904 B1                                         Page 1 of 1
APPLICATION NO.   : 12/832468
DATED             : June 26, 2012
INVENTOR(S)       : Carter et al.

It is certified that error appears in the above-identified patent and that said Letters Patent is hereby corrected as shown below:

Col. 3, Line 36;   Delete "aim" and Insert --arm--

Col. 3, Line 39;   Delete "aim" and Insert --arm--

Col. 3, Line 51;   Delete "aim" and Insert --arm--

Col. 6, Line 7, Claim 1;   Delete "firs" and Insert --first--

Signed and Sealed this
Second Day of October, 2012

David J. Kappos
*Director of the United States Patent and Trademark Office*